(12) United States Patent
Mardirossian

(10) Patent No.: US 7,281,418 B2
(45) Date of Patent: Oct. 16, 2007

(54) SYSTEM AND METHOD OF MEASURING WEIGHT OF PASSENGERS AND LUGGAGE, AND WEIGHT DISTRIBUTION OF AIRCRAFT

(75) Inventor: Aris Mardirossian, Germantown, MD (US)

(73) Assignee: Technology Patents, LLC, Derwood, MD (US)

( * ) Notice: Subject to any disclaimer, the term of this patent is extended or adjusted under 35 U.S.C. 154(b) by 95 days.

(21) Appl. No.: 11/178,596

(22) Filed: Jul. 12, 2005

(65) Prior Publication Data
US 2007/0012106 A1 Jan. 18, 2007

(51) Int. Cl.
*B64C 17/00* (2006.01)
*G01G 19/03* (2006.01)

(52) U.S. Cl. ............... 73/65.05; 73/65.06; 73/862.041; 702/175; 701/124

(58) Field of Classification Search ............... 73/65.05, 73/65.06; 244/194; 701/124; 702/175
See application file for complete search history.

(56) References Cited

U.S. PATENT DOCUMENTS

| | | | | |
|---|---|---|---|---|
| 3,513,300 A | | 5/1970 | Elfenbein et al. | |
| 3,584,503 A | * | 6/1971 | Senour | 73/65.06 |
| 4,110,605 A | * | 8/1978 | Miller | 701/124 |
| 4,446,524 A | * | 5/1984 | Wendt | 701/124 |
| 4,935,885 A | * | 6/1990 | McHale et al. | 702/175 |
| 5,880,409 A | * | 3/1999 | Hartman | 177/137 |
| 6,032,090 A | * | 2/2000 | von Bose | 701/37 |
| 6,237,407 B1 | | 5/2001 | Nance | |
| 6,275,769 B1 | | 8/2001 | Willis | |

* cited by examiner

*Primary Examiner*—Eddie Lefkowitz
*Assistant Examiner*—Freddie Kirkland, III
(74) *Attorney, Agent, or Firm*—Nixon & Vanderhye P.C.

(57) ABSTRACT

In certain example embodiments there is provided a method and/or system for operating an aircraft, including (a) before an aircraft is loaded with passengers and luggage, performing a first measuring to measure a load on front landing gear strut(s) and rear landing gear strut(s) in order to obtain first weight data; and (b) after the aircraft has been loaded with passengers and luggage, performing a second measuring to measure a load on front landing gear strut(s) and rear landing gear strut(s) in order to obtain second weight data. Then, the first weight data is subtracted from the second weight data, while optionally compensating for fuel added to the aircraft between the times of the first and second measuring steps, in order to determine a total weight of the passengers and luggage on the aircraft. This total weight can be used in determining whether or not the plane is overloaded.

8 Claims, 3 Drawing Sheets

SYSTEM AND METHOD OF MEASURING WEIGHT OF PASSENGERS AND LUGGAGE, AND WEIGHT DISTRIBUTION OF AIRCRAFT This invention relates to a system and/or method for measuring the total weight of passengers and luggage on an aircraft, and/or for measuring the weight distribution of an aircraft.

BACKGROUND AND SUMMARY OF THE INVENTION

It is know that to be safely operated, an aircraft cannot be overloaded in terms of weight. Moreover, the balance of an aircraft (i.e., weight distribution) also has to be within certain specifications for the aircraft to be safely operated. For example, if an aircraft is too heavily loaded it may have trouble taking off and/or navigating in certain situations. As another example, if too much weight is in the front of an aircraft (compared to a rear and/or central section of an aircraft), the aircraft may also have trouble taking off and/or navigating in certain situations.

In view of the above, there exists a need in the art for monitoring total weight and weight distribution in an aircraft, to ensure safe operations.

U.S. Pat. No. 6,275,769 discloses a weight and balance calculator for an aircraft. Unfortunately, the system of the '769 Patent relies on data entry (e.g., weight data) from the pilot himself, which can lead to inconsistencies and/or oversights if the pilot is not properly informed.

U.S. Pat. No. 6,237,407 discloses an aircraft weight and center of gravity indication system. Pressure sensors are provided in each of the landing gear struts of the aircraft, and data therefrom is used to determine total weight. See also U.S. Pat. No. 3,513,300. Unfortunately, the system of the '407 Patent is undesirable in that it cannot determine the weight of passengers and luggage per se (i.e., only the total weight of the plane with the passengers and luggage thereon can be approximated). Moreover, the '407 Patent discusses that sensors for measuring the weight on landing gear struts can have problems and not measure the total weight accurately. This can lead to problems in that the pilot cannot determine the total weight of the passengers and aircraft, which can be particularly problematic in situations where the pressure sensors are not properly calibrated or entirely accurate.

For example consider the following situation, where the pressure sensors indicate that the total weight of the loaded aircraft is x and the total permissible weight is x+1%. If the pressure sensor(s) are improperly calibrated or incorrect by 20%, the aircraft can be up to 19% overloaded without the pilot being aware of this. A problem such as this cannot be detected using the system of the '407 Patent which only takes into account the total weight after the passengers and luggage have been loaded onto the aircraft.

In view of the above, it would be helpful for a system to be provided which could determine the total weight of the passengers and luggage on an aircraft, independent of the aircraft itself. If this could be determined, this would reduce the significance of improper calibrations of strut pressure sensors or the like, because the large total weight component of the plane itself would not be considered. Thus, a total weight limit of passengers and luggage could be used to double-check total weight and/or balance requirement of an aircraft in an attempt to prevent situations such as that discussed above from occurring.

Moreover, in certain example embodiments of this invention, a system is provided for detecting when the plane is on non-level ground (e.g., a tilted runway), and for compensating for this non-level ground. This permits more accurate measurements to be made.

In certain example embodiments of this invention, there is provided a method of operating an aircraft, the method comprising: before an aircraft is loaded with passengers and luggage, performing a first measuring to measure a load on front landing gear strut(s) and rear landing gear strut(s) in order to obtain first weight data; after the aircraft has been loaded with passengers and luggage, performing a second measuring to measure a load on front landing gear strut(s) and rear landing gear strut(s) in order to obtain second weight data; subtracting the first weight data from the second weight data, and optionally compensating for fuel added to the aircraft between the times of the first and second measuring steps, in order to determine a total weight of the passengers and luggage on the aircraft; and comparing the measured total weight of the passengers and luggage on the aircraft with a predetermined threshold, and if the measured total weight of the passengers and luggage exceeds the predetermined threshold then actuating an alarm.

In other example embodiments of this invention, there is provided an aircraft comprising: means for, before the aircraft is loaded with passengers and luggage, performing a first measuring to measure a load on front landing gear strut(s) and rear landing gear strut(s) in order to obtain first weight data; means for, after the aircraft has been loaded with passengers and luggage, performing a second measuring to measure a load on front landing gear strut(s) and rear landing gear strut(s) in order to obtain second weight data; means for subtracting the first weight data from the second weight data, and optionally compensating for fuel added to the aircraft between the times of the first and second measuring steps, in order to determine a total weight of the passengers and luggage on the aircraft; and means for comparing the total weight of the passengers and luggage on the aircraft with a predetermined threshold, and if the total weight of the passengers and luggage exceeds the predetermined threshold then actuating an alarm.

DETAILED DESCRIPTION OF EXAMPLES OF THE INVENTION

This invention relates to a system and/or method for measuring the total weight of passengers and luggage on an aircraft, and/or for measuring the weight distribution of an aircraft.

Figure 1:
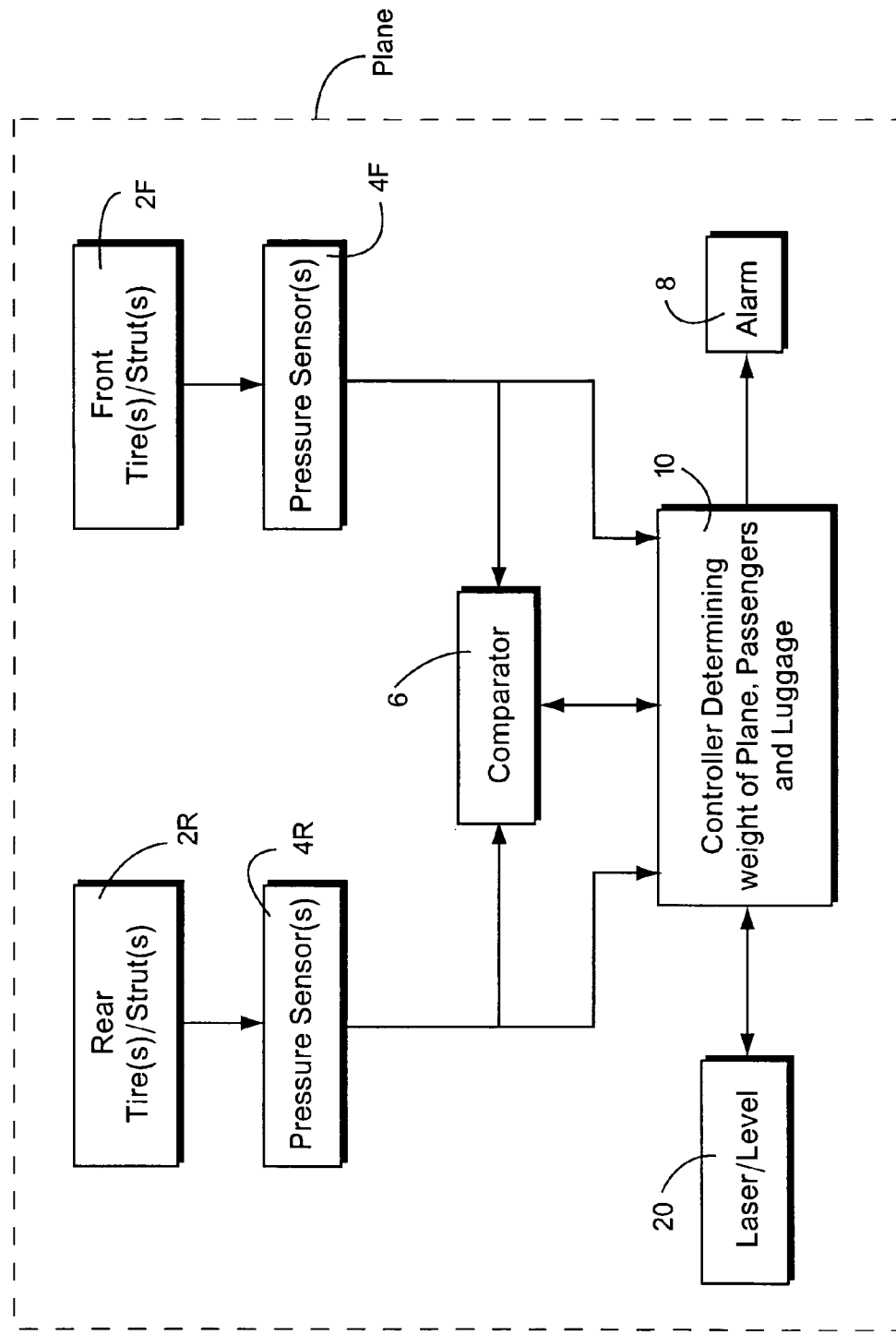
FIG. 1 is a circuit diagram of a system according to an example embodiment of this invention.
Figure 2:
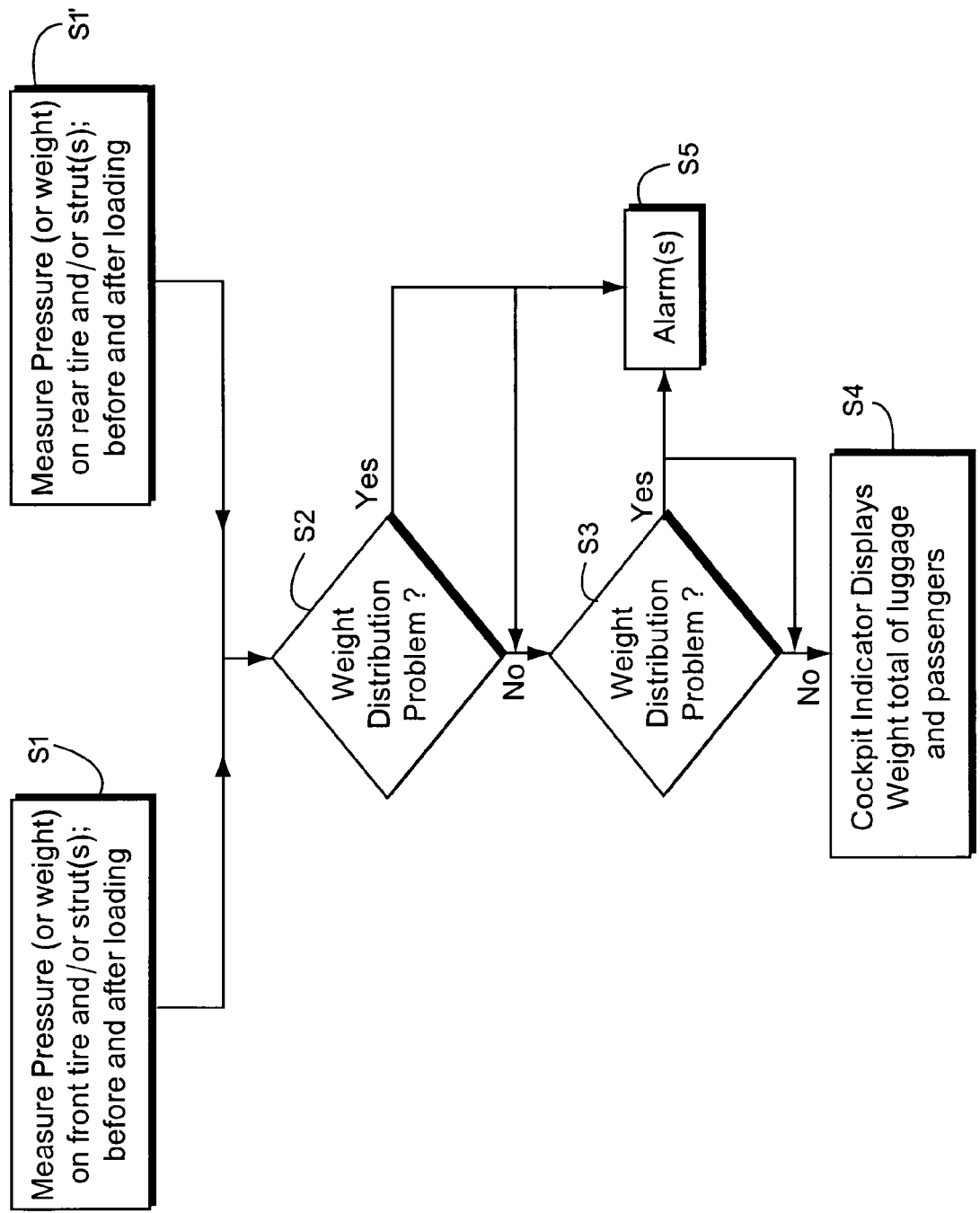
FIG. 2 is a flowchart according to an example embodiment of this invention.

FIGS. 1-2 illustrate an example of a circuit diagram and flowchart according to certain example embodiments of this invention. Referring to FIGS. 1-2 for example and without limitation, there is provided a system and method of operating an aircraft such as a commercial airliner (e.g., jet or propeller aircraft). The aircraft is provided with both front and rear landing gear strut(s) 2F and 2R, respectively, which may be at least partially filled with fluid as known in the art. A pressure sensor 4 (see 4F and 4R in FIG. 1) is provided for each such landing gear strut, for measuring the total weight supported by that landing gear strut.

Steps S1 and S1' in FIG. 2 illustrate that before an aircraft is loaded with passengers and luggage, a first measuring is performed on the landing gear struts 2F and 2R to measure a load on front landing gear strut(s) and rear landing gear strut(s) in order to obtain first weight data which indicates total weight of the aircraft at that time. Then, still referring to steps S1 and S1', after the aircraft has been loaded with passengers and luggage, a second measuring is performed to measure a load on front landing gear strut(s) 2F and rear landing gear strut(s) 2R in order to obtain second weight data which indicates the total weight of the aircraft at that time. Then, the first weight data is subtracted from the second weight data in order to determine a total weight of the passengers and luggage on the aircraft; in certain example embodiments this determination of the total weight of the passengers and luggage is determined and/or stored by controller 10.

Optionally, if fuel had been added to the aircraft between the times of the first and second measuring steps, the addition of this fuel can be compensated for in determining the total weight of the passengers and luggage. For example, if y gallons of fuel are added between the times of the first and second measuring steps, then the product y x w (where w is the weight of one gallon of fuel) is summed with the first weight data and this sum is subtracted from the second weight data in order to determine the total weight of the passengers and luggage on the aircraft by controller 10.

Comparator 6 then compares the load on the front strut(s) with the load on the rear struts in step S2 to determine if there is a weight distribution problem on the plane. For example, if the difference between the two values is outside of a particular range, then an alarm 8 is actuated at S5. Alarm 8 may be an audio alarm in the cockpit and/or a visual alarm in the cockpit of the aircraft.

Once the total weight of the passengers and luggage (including passenger luggage and mail shipments for example) has been determined (independent of the weight of the plane itself) as discussed above, comparing the total weight of the passengers and luggage on the aircraft with a predetermined threshold in step S3 (using comparator 6 or a comparator in controller 8) to determine if the aircraft is overloaded. If the total weight of the passengers and luggage exceeds the predetermined threshold in S3, then actuating an alarm 8 in step S5 in order to indicate that the plane is overloaded. The alarms for the overloading and bad weight distribution may be part of the same alarm, or alternatively may be different alarms in different embodiments of this invention.

Regardless of whether an alarm is actuated, an indicator or display in the cockpit of the aircraft in communication with controller 10 displays the calculated total weight of the passengers and luggage for the pilot's information at S4. The pilot can use this data in determining whether the strut sensors are out-of-calibration for example. As an example, if the aircraft has very few passengers and not much luggage, if the aircraft is close to or over the weight threshold then the pilot can make an assumption or ask someone to check into whether the landing gear strut load sensors are out-of-calibration.

Figure 3:
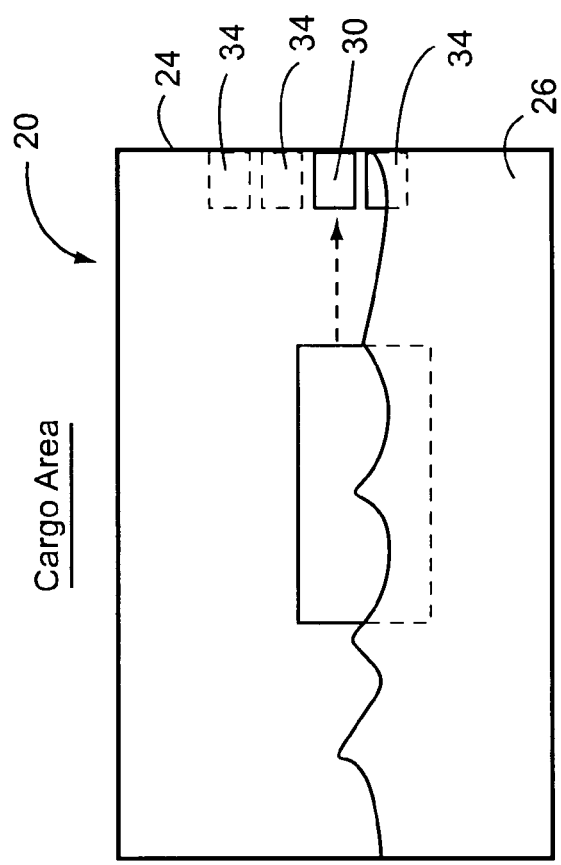
FIG. 3 is a schematic diagram of a compensation system of detecting and compensating for plane sitting on non-level ground in accordance with an example embodiment of this invention.
Figure 4:
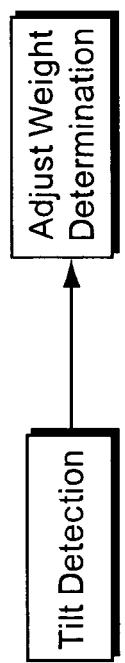
FIG. 4 is a flowchart illustrating use of the FIG. 3 system according to an example embodiment of this invention.

FIGS. 3-4 illustrate a level-compensation system that may be used in conjunction with the embodiments discussed above. In particular, a system is provided for detecting when the plane is on non-level ground (e.g., a tilted runway), and for compensating for this non-level ground. This permits more accurate measurements to be made. In FIG. 3, a laser level system 20 is provided in the plane (e.g., in the cargo area of the plane) to detect when the plane is on a non-level surface. The laser level system includes laser 22 that is designed to float in container 24 that houses supporting liquid 26 such as water or the like. Laser 22 emits a beam 28 toward target 30 that is supported on a wall of the container 24. If the laser or some other system detects that the beam 28 hits target 30, then it is confirmed that the plane is resting or supported on level or substantially level ground such as a runway. However, if it is detected or determined that laser beam 28 is not hitting target 30, then it is assumed or determined that the plane is not on level ground (e.g., it is on a sloped or tilted surface such as a runway). Since sloped supporting surfaces can adversely affect weight measurements, this is compensated for. Thus, possible auxiliary target(s) 34 may be provided for determining how sever the slope is of the surface on which the plane is sitting or moving. Based on which of the auxiliary targets is hit with the laser beam 28 from the laser, it can be calculated or determined how severe the slope of the ground is under the plane, and the weight calculations at 10 can be adjusted accordingly based on this degree of slope or incline. Thus, more accurate measurements can be made, and sloped ground will not adversely affect measurements or weight distributions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of operating an aircraft, the method comprising:
    before an aircraft is loaded with passengers and luggage, performing a first measuring to measure a load on front landing gear strut(s) and rear landing gear strut(s) in order to obtain first weight data;
    after the aircraft has been loaded with passengers and luggage, performing a second measuring to measure a load on front landing gear strut(s) and rear landing gear strut(s) in order to obtain second weight data;
    subtracting the first weight data from the second weight data, and optionally compensating for fuel added to the aircraft between the times of the first and second measuring steps, in order to determine a total weight of the passengers and luggage on the aircraft;
    determining whether the aircraft is supported by inclined or tilted ground such as a runway, and when it is determined that the aircraft is supported by inclined or tilted ground then adjusting the total weight determined based on the incline or tilt of the ground;
    comparing the total weight of the passengers and luggage on the aircraft with a predetermined threshold, and if the total weight of the passengers and luggage exceeds the predetermined threshold then actuating an alarm; and
    wherein a floating laser is provided in the plane for determining whether the aircraft is supported by inclined or tilted ground, and wherein a plurality of targets or target areas are provided and tilt or incline of the ground supporting the aircraft is determined based on which of the targets or target areas is hit with a laser beam from the floating laser.

2. The method of claim 1, wherein when fuel has been added to the aircraft between the times of the first and second measuring steps, then summing the weight of the fuel added and the first weight data to obtain a sum value, and subtracting the sum value from the second weight data in order to determine the total weight of the passengers and luggage on the aircraft.

3. The method of claim 1, further comprising comparing a total load on the front strut(s) with a total load on the rear struts from the second measuring step, and if a difference between the two values is outside of a particular range then actuating an alarm in the cockpit to signal a weight distribution problem.

4. An aircraft comprising:
means for, before the aircraft is loaded with passengers and luggage, performing a first measuring to measure a load on front landing gear strut(s) and rear landing gear strut(s) in order to obtain first weight data;
means for, after the aircraft has been loaded with passengers and luggage, performing a second measuring to measure a load on front landing gear strut(s) and rear landing gear strut(s) in order to obtain second weight data;
means for subtracting the first weight data from the second weight data, and optionally compensating for fuel added to the aircraft between the times of the first and second measuring steps, in order to determine a total weight of the passengers and luggage on the aircraft;
means for comparing the total weight of the passengers and luggage on the aircraft with a predetermined threshold, and if the total weight of the passengers and luggage exceeds the predetermined threshold then actuating an alarm; and
means for determining whether the aircraft is supported by inclined or tilted ground such as a runway, and when it is determined that the aircraft is supported by inclined or tilted ground then adjusting the total weight determined based on the incline or tilt of the ground.

5. The aircraft of claim 4, further comprising means for, when fuel has been added to the aircraft between the times of the first and second measuring steps, summing the weight of the fuel added and the first weight data to obtain a sum value and subtracting the sum value from the second weight data in order to determine the total weight of the passengers and luggage on the aircraft.

6. The aircraft of claim 4, further comprising means for comparing a total load on the front strut(s) with a total load on the rear struts from the second measuring step, and if a difference between the two values is outside of a particular range then actuating an alarm in the cockpit to signal a weight distribution problem.

7. The aircraft of claim 4, wherein the means comprises a floating laser provided in an enclosed compartment or container.

8. A method of operating an aircraft, the method comprising:
before the aircraft is loaded with passengers and luggage, performing a first measuring to measure a load on front landing gear strut(s) and rear landing gear strut(s) in order to obtain first weight data;
after the aircraft has been loaded with passengers and luggage, performing a second measuring to measure a load on front landing gear strut(s) and rear landing gear strut(s) in order to obtain second weight data;
subtracting the first weight data from the second weight data, and optionally compensating for fuel added to the aircraft between the times of the first and second measuring steps, in order to determine a total weight of the passengers and luggage on the aircraft;
comparing the total weight of the passengers and luggage on the aircraft with a predetermined threshold, and if the total weight of the passengers and luggage exceeds the predetermined threshold then actuating an alarm; and
determining whether the aircraft is supported by inclined or tilted ground such as a runway, and when it is determined that the aircraft is supported by inclined or tilted ground then adjusting the total weight determined based on the incline or tilt of the ground.

* * * * *